UNITED STATES PATENT OFFICE.

FREDERICK M. EKERT, OF DAYTON, OHIO.

HIGH-RESISTING BODY.

No. 858,504.  Specification of Letters Patent.  Patented July 2, 1907.

Application filed October 25, 1906. Serial No. 340,542.

*To all whom it may concern:*

Be it known that I, FREDERICK M. EKERT, a citizen of the United States, residing at Dayton, in the county of Montgomery and State of Ohio, have invented a certain new and useful Improvement in High-Resisting Bodies, of which the following is a full, clear, and exact description, reference being had to the accompanying drawings.

My invention relates to bodies suitable for the production of valve disks or packings, tubing, hose, etc. of great tensile strength and of such resisting qualities as to withstand high pressures of fluids and the high temperature of steam as employed in modern industries.

As is well known, the pressures and temperatures under which steam was formerly employed in the various industries were very low as compared with those which now obtain. As a result, packings and valve disks of composition and metal that were satisfactory with the former low pressures and temperatures have proven worthless with the changed conditions under which the steam is now employed, such packings and valve disks leaking and speedily deteriorating. As is also well known, hose and other tubing as heretofore constructed have not possessed sufficient high-resisting qualities and tensile strength to withstand the pressures and temperatures of the fluids conveyed thereby.

It is the object of my invention to furnish bodies suitable for the production of the articles above described as well as for the production of articles generally which require greatest tensile strength and highest-resisting qualities.

In my Patent No. 802,377, I have set forth a composition of matter which has proven eminently satisfactory for use in the construction of linings and valve disks and packings for high pressure steam. This composition consists mainly of a vulcanizable compound of rubber or similar materials of gumlike consistency, sulfur, lead monoxid and asbestos, to which are added high resisting pore fillers. As has been indicated in a former application, I am enabled to produce compositions of matter suitable for withstanding the modern high pressures and temperatures of steam by mingling with comparatively little friction through pressure applied by even motion rolls or substantially even motion rolls, and by employing my dry process, rubber with sulfur and large quantities of asbestos or other suitable fiber, thereby enabling me to preserve to a large extent or substantially entirely the fibrous condition of the fiber. This intermingling is done by the application of even or nearly even pressures in opposite directions on the rubber and fiber, and with this mass thus produced there is incorporated suitable pore filling material as well as any emollient that may be desired. The body thus produced is more or less resilient and forms a tight seat with the valve and a tight fitting with steam joints, while such disks and packings as well as all of the other articles which may be made by my process, as tubing, hose, etc., possess great strength of body and marked tensile strength.

I have discovered that, by applying to the disks, packings, linings, etc. produced by my process, a thin metallic protection, in the form of a coating or mantle partly or wholly covering the same or in the form of a wire wound spirally thereon, (the metal employed for this purpose being nickel or other metal coated therewith) such bodies are capable of withstanding extremely high mechanical pressures or high pressures and temperatures of steam or other fluid. In preparing tubing, valves, disks and packing for use with such mantles or coatings, I prefer to mingle the ingredients in substantially the same manner as set forth in my process application hereinbefore referred to; that is to say, I mingle the rubber and sulfur in a dry condition, incorporating the fiber into the rubber and sulfur by pressing it thereinto with little or no friction, continuously bringing the fiber into the folded compound with even or nearly even pressure applied in substantially opposite directions, preferably after which the porefilling material is added, using for the pore-fillers either the ones specifically enumerated in my Patent No. 802,377, or others, more or less suitable, either alone or in addition to such pore-fillers, such as silica, silicates, aluminium, lead, antimony, calcium and magnesia and similar materials, or combinations or mixtures of the same. These pore fillers may be employed to advantage when highest steam-resisting qualities are not necessary but where strength is necessary, as in the case of tubing, hose, tires, etc., such strength being secured by the employment of the fiber which is incorporated by my dry process. After so preparing the composition, I form the same into bodies of the desired shape and apply thereto the metallic protection hereinbefore referred to which is of nickel or nickel-coated metal of from 1/64th to 1/500th of an inch in thickness. This protection covers the body partially or entirely. The best results for valve disks and packings are obtained by employing a thin nickel mantle entirely covering the body. This mantle not only protects the surface of the body but prevents the same from swelling to an undesirable extent and holds it in the best shape for performing the work for which it is designed, also adding to the mechanical strength thereof. The thinness of the mantle enables it to receive more readily the impression of the valve or other surface which may be brought into contact therewith, thereby enabling it to effectually resist leakage, while the material of which it is made prevents oxidation thereof. The resistance of the body can be further improved by incorporating therein layers of nickel sheets or wires. A coating of nickel wire or wire coated with nickel is preferred where a still larger degree of resistance is desired, as, for example, for the linings of hose and other tubing which convey fluids under high pressures or temperatures, or both, or for increasing the tensile strength of water-hose, tubes, tires, etc. While, as indicated, the employment of this protecting surface is particularly useful in connection with valve disks, packings, hose and other tubing and linings produced by my process hereinbefore referred to and employing the ingredients hereinbefore specified, it will be understood that it is not limited in its application to the specific compositions referred to, and I do not propose to be limited to its use in connection with such compositions.

In mixing the fiber with rubber, I roll the rubber flat between the rolls, throw in the asbestos or other fiber, fold the rubber and roll out flat, repeating the operation until the requisite amount of fiber has been added to the rubber and thoroughly mixed therewith. This process permits of the rapid incorporation of large quantities of fiber with the rubber, and the pore-filling material may be added by the same manipulation.

As previously stated, there are other articles wherein the main desiderata are tensile strength and density, as for example, water-hose, tubing and tires. The tensile strength of these articles is greatly increased through the incorporation therewith of fiber (whether organic or inorganic) by my new process, such incorporating being accomplished by the folding action hereinbefore referred to and the employment of even or nearly even motion rolls for this purpose. Such tires, tubing, hose, etc. can be reinforced by the nickel (or nickel-coated metal) or provided with an insertion of nickel wire with great improvement thereto. As nickel does not oxidize as readily as other metals it is the metal best suited for the purpose, whether used alone or as a coating for other metals.

Having thus described my invention, I claim:

1. A body for the purposes specified containing fiber having nickel incorporated therewith.

2. A body for the purposes specified containing fiber, rubber, sulfur and pore-filling material and having nickel incorporated therewith.

3. A body for the purposes specified containing fiber, rubber, sulfur and pore-filling material having nickel incorporated therewith, said body having a surface reinforcement of nickel.

4. A body for the purposes specified comprising a vulcanizable compound of rubber, sulfur, and fiber having incorporated therewith layers of nickel.

5. A body for the purposes specified comprising a fibrous compound having nickel incorporated therewith and having applied thereto a reinforcement of nickel.

6. A disk or packing suitable for use with steam or other fluid under high pressure and temperature, said disk or packing consisting of a somewhat resilient or yielding body having applied thereto a thin, pliable coating or mantel of nickel.

7. A disk or packing suitable for use with steam or other fluid under high temperature consisting of a body containing rubber, sulfur and fiber and having applied thereto a thin coating or mantel of nickel.

8. A disk or packing suitable for use with steam or other fluid under high pressure and temperature, said disk or packing consisting of a body containing rubber, sulfur, fiber and pore-filling materials and having applied thereto a thin coating or mantel of nickel.

9. A body suitable for use in the presence of fluids under high pressure and temperature, said body consisting of a resilient fibrous compound having applied thereto a thin and somewhat pliable coating or mantel of nickel.

10. A valve disk or packing consisting of a vulcanizable compound of rubber, sulfur, fiber and pore-filling material having applied thereto a thin and somewhat pliable coating or mantel of nickel.

In testimony whereof, I hereunto affix my signature in the presence of two witnesses.

FREDERICK M. EKERT.

Witnesses:
ROSCOE T. STAUTER,
JESSIE L. FAIRCHILD.